United States Patent [19]

Carle

[11] 3,729,888
[45] May 1, 1973

[54] MACHINE FOR TRANSFERRING MOLDED CHOCOLATE PRODUCTS FROM THEIR SHAPING MOLDS TO PACKING BOXES

[76] Inventor: Giovanni Carle, Via Neera 39, Milan, Italy

[22] Filed: May 10, 1971

[21] Appl. No.: 141,702

[30] Foreign Application Priority Data

June 20, 1970 Italy..............................26315 A/70

[52] U.S. Cl.......................................53/251, 53/247
[51] Int. Cl. ..............................................B65b 5/08
[58] Field of Search................................53/251, 253

[56] References Cited

UNITED STATES PATENTS

3,300,945  1/1967  Grossi et al.........................53/251 X
3,374,600  3/1968  Rademacher et al...............53/251 X

*Primary Examiner*—Travis S. McGehee
*Attorney*—Kirschstein, Kirschstein, Ottinger & Frank

[57] ABSTRACT

A machine for transferring molded chocolate products from their shaping molds to packing boxes, of the type designed to operate between a first conveyor band or the like whereon the molds, coming from the molding plant, are continuously fed, and a second conveyor band or the like, located parallel to, and at the level of said bands. The second band feeds the empty packing boxes. The machine comprises two sets of pneumatically operated, similar members, designed to take-up and to lay down, respectively, the chocolate products only, to which products oppositely directed swinging motions through 90° are imparted in respect of a vertical middle plane, whereby to bring said sets from their horizontal position, above of related conveyor bands, to a vertical position wherein they are confronted with each other, a vacuum distribution being timed in such a manner that the chocolate products are taken-up from the molds, coming from the molding plant on the related conveyor band, by one set of members, then transferred to the other set of members while both sets are confronted with each other, and finally laid down, overturned through 180°, into the packing boxes conveyed by the second band, or directly on to the second band to be conveyed to wrapping equipment.

10 Claims, 10 Drawing Figures

MACHINE FOR TRANSFERRING MOLDED CHOCOLATE PRODUCTS FROM THEIR SHAPING MOLDS TO PACKING BOXES

OBJECT OF THE INVENTION

1. Field of the Invention

This invention concerns a machine by which molded chocolate products are transferred from their shaping molds to packing boxes or to wrapping equipment. More precisely, the invention is directed to a device, synchronized with both conveyors of chocolate products still contained in the molds coming from the molding plants, and of packing boxes, or even of loose products, respectively, and that are installed on the opposite sides of the machine, and which is adapted to have same products transferred from the one, to the other of band conveyors by tilting them through 180°.

2. Brief Discussion of Nearest Prior Art

As well known, in the plants for the production of chocolate, chocolate bars, chocolate sticks and other chocolate sweets, such products are currently transferred by hand from their shaping molds to packing boxes or wrapping equipment, with all the ill-effects that can be readily imagined.

Attempts have therefore been made to have the principles of automation applied to such operation, and different equipments have been proposed to such a purpose. In one of such equipments it was endeavoured to transfer the considered products by a dual motion, i.e., the products still contained in their molds were firstly overturned from their conveyor on to an intermediate device, and then linearly conveyed over the packing box conveyor by means of a hunting suspension of mold-products unit.

With regard to the design and embodiment form of such device, it is to be kept in mind that the dual motion unavoidably results in a number of drawbacks, caused both by the intricacy and large number of components, and by the large weight of product-mold assemblage, for the realization of which, therefore, considerable difficulties often are to be overcome.

At any rate, the point is that neither the above described prior art device, nor all other already proposed automatic mechanisms, have found any practical application, whereby the considered problems is yet essentially unsolved.

SUMMARY OF THE INVENTION

The main purpose of the invention is to obviate the above specified drawbacks by the provision of an efficient and inexpensive machine, by which chocolate products can be transferred from their shaping molds to packing boxes, and which shows a conveying capacity at least equal to, or even higher than that of previous production lines.

Another and not less important purpose of the invention consists in the provision of a machine by which the operating costs, and in particular the costs of labor, can be minimized, by mechanizing the feed both of the molds and of the empty boxes, contrary to what is now being done in the presently operating plants, where such operations are manually performed.

A further purpose of the invention consists in the provision of a machine which is adapted to handle even very delicate products, as e.g., soft centred sweets covered by a thin chocolate layer, being for such a purpose equipped with prehensile members, which are particularly suitable to take-up and to support them.

The above and further purposes are attained by the machine for transferring sweet products from their shaping molds to packing boxes, or to wrapping equipment, and operating between a first conveyor band, coming from the shaping plant and by which the molds filled with the products are conveyed, and a second conveyor band, located parallel to, and coplanar with the first band, such machine being characterized essentially in that it is fitted with a pair of pneumatically operated members, adapted to take-up the products only from their molds, then leaving them down, and to which members oppositely directed swinging motions through 90°, symmetrically contrary in respect of an intervening vertical middle plane, are simultaneously imparted, whereby to bring the take-up planes from their horizontal positions on both conveyor bands, to a vertical position wherein they are confronted with each other, said two take-up members being controlled by a pneumatic device in such a way that the product only is taken-up from the molds by one member, handed-over to the other member when both members are vertically confronted, and then laid down, by a tilting motion through 90° of latter member, into the packing boxes as conveyed by the related second conveyor band, or on to the second band by which it is then conveyed to wrapping equipment.

The device is synchronized with the conveyor bands in such a manner that the transfer cycle time is exactly equal to time required to the bring the next mold under the take-up member, and the next empty box under the member by which the products are laid down.

According to the invention, the symmetrically opposite motions are imparted to two members, by which the products are taken-up and laid-down, respectively, by two toothed sectors in mesh with each other and keyed to horizontal axes, located between the conveyor bands and parallel to running direction thereof. Fast with each toothed sector is an arm, the free end of which is pivotally connected with the horizontal axis of gravity of the take up member, which is also slidingly connected with a pendulously hanging overhead rod — the whole in such a manner that, due to the combined action of the previously specified connections, and owing to reciprocating swinging motion through 90° as imparted to the toothed sectors and to their arms, both take-up and lay-down members are moved, with their gravity axes, along the circular path covered by the arms ends, and simultaneously are swung also through 90° about same gravity axes from the horizontal positions, to vertical positions, wherein same planes are confronted with each other, and vice-versa in the return strokes.

In point of fact it may be stated that the bigger technical advantage of the invention, as compared with the prior art, consists in that the product is tranferred from a first conveyor band to a second band without overturning the molds, which conversely are conveyed further on by their band.

Moreover, the use of pneumatically controlled suckers permits even the most delicate products to be taken-up and laid-down without the least damage.

Now, according to above described design of transferring mechanism, and taking also due account of the fact that the arrangement of products in their molds is always the same, the suckers of both members should be located in fixed positions, whereby the product is laid down into the packing boxes always in the same manner, i.e., with always identical spacings and mutual distribution. It follows that by the above device, it would be impossible to meet widely varying packing requirements. In view of what precedes, a further purpose of the invention consists in the provision of a simple and efficient device, strictly associated with the transferring mechanism and allowing to change at will the arrangement of products in the packing boxes, whereby to obviate the above stated drawback.

In a modified embodiment of the machine by which chocolate products are transferred from their shaping molds into packing boxes, the member by which the product is withdrawn from the taking-up member and is laid down into the packing boxes, is equipped with suckers movably fitted in a plane parallel to that wherein the products are supported, and that can be properly adjusted by means of a suitable mechanism, that allows them to be positioned in the pattern and at mutual spacing as required in each case.

According to such modified embodiment, the sucker positioning device essentially consists of two rows of cylindrical rods, lying in adjacent planes perpendicular with each other and thus mutually intersecting, being almost in contact at their crossing points, and of sucker-carrying cubic blocks that are formed with two through bores, extending accordingly to the directions and positions of the two rods that are thredded therethrough, thus allowing each block to be moved along both rods, i.e., in two directions perpendicular with each other, the whole in such a manner as to allow the crossing points of net-like arrangement of cubic blocks, and thus of suckers, nearer or further apart from one another, the different positionings being obtained by means of two combs, located on the contour of the quadrilateral area wherein the rods are located and formed with suitably oriented, inclined slots, wherein the rod ends are guided, the whole in such a manner that, by shifting the rods relative to said combs, in directions perpendicular to planes of said rods, mutually different positionings of cubic blocks can be attained.

A cylinder-piston unit is provided to impart to the rods the required motion relative to the combs, the rods being associated with the piston, whilst the combs are secured to cylinder and thus to the stationary machine frame.

BRIEF DESCRIPTION OF DRAWINGS

The invention will now be disclosed in the following description of two practical embodiments thereof, as shown in the accompanying drawings, both the description and the drawings being given as a non-restrictive example only.

In the drawings.

DESCRIPTION OF A PREFERRED EMBODIMENT

Referring now to said drawings, and firstly to FIGS. 1 to 4 inclusive thereof, $T_A$ is the first conveyor band by which the product-containing molds are conveyed, $T_B$ is the second conveyor band by which the empty packing boxes are conveyed (or by which the product is fed to wrapping machines) and D is the device of the present invention by which a product is withdrawn from the first band $T_A$ and is laid down on the second band $T_B$.

In more detail, the products 2 are removed from the recesses 3 of molds S by the take-up members 1a (see FIG. 2) of device D, and are then laid down by the members 1b (see FIG. 2) (wholly similar to members 1a) into the cavities 4 of packing boxes C, or when no boxes are utilized, said products 2 are laid directly down on to the second band $T_B$, and conveyed to wrapping equipment, as previously stated.

In the considered example, the molds S, carried by the first conveyor band $T_A$, is formed with four recesses 3, and accordingly four cavities are shown by the boxes C. Therefore, the members 1a and 1b, by which the products are taken-up and laid down, respectively, are fitted with four similarly arranged suckers, by which the products are acted upon, said being suckers connected through the chamber 6 and the duct 7 with the vacuum source (not shown). Obviously, when a different number of arrangement of recesses and cavities is shown by the molds and boxes, members 1a and 1b (similar with each other) having a corresponding number of appropriately located suckers 3, are fitted on the machine. For this purpose the lower plate 14, by which said suckers are carried, is replaceable.

According to the invention, the member 1a (and likewise the member 1b) is swingingly fitted about a horizontal axis 8, extending through the center of gravity of its chamber 6, said axis 8 being pivotally connected on the free end of an arm 9, which is rotated along with its toothed sector 10a (the arm 9 for the member 1b has a toothed section 10b), about a fixed axis 11, that extends parallel to conveyor band $T_A$ (or $T_B$) at a level slightly higher than that of said bands.

All components of the previously described device D are present also in the left half of figures, and are indicated by the same reference letters, except for the toothed sectors 10a and 10b, in mesh with each other, and for the laying-down member, which is indicated by 1b, to distinguish it from the taking-up member 1a.

Said taking-up member 1a is, moreover, slidingly fitted on an overhead rod 12, pendulously hanging from the stationary axis 13, and extending perpendicularly to the interchangeable, sucker carrying plate 14; the same can be obviously said for the laying-down member 1b.

In point of fact the taking-up member (and likewise the similar laying down member) is subjected to a double constraint, the first of which is given by the association of its axis 8 with the end of arm 9, while the second ensues from the fact that it is compelled to slide in a direction perpendicular to pendularly hanging overhead rod 12. Therefore, when a reciprocating rotary motion (through 90°) is imparted to toothed sectors 10a and 10b, the arms 9 and thus also the axes 8 travel along the paths indicated by the arrows $f_A$ and $f_B$; simultaneously to such motion, both members 1a and 1b, being constrained to slide along the rods 12, pendularly hanging from 18, are turned about the axes 8, and are thereby brought from their positions wherein the plates 14 are horizontally located over the recesses 3 of molds S, and over the cavities 4 of boxes C, respectively (see FIG. 2), to their positions wherein said plates are vertically confronted with each other (see FIG. 3).

In the course of said rotation through 90°, a vacuum is maintained by the pneumatic circuit in the suckers of member 1a, and as soon as said two plates are vertically confronted, the vacuum is transferred from the suckers of taking-up member 1a to the suckers of laying-down member 1b, whereby the products are also transferred in latter suckers, and then laid, at the end of reverse swinging motion (arrows $f'_A$ and $f'_B$ – see FIG. 4) down (overturned by 180° in respect of their original position in the mold recesses) into the cavities 4 of packing box C.

By making the transfer time equal to the time required for bringing the next mold and the next packing box C under the respective sucker carrying plates (on the basis of conveyor band speeds) the products that are taken-up from the molds S that are being conveyed by the band $T_A$, at the very moment wherein the recesses 3 are coincident with the suckers 5, are laid down into the boxes C, located symmetrically to the molds, or directly on to the band $T_B$.

Further advantages are secured by the device according to the invention in addition to the above mentioned ones, and namely:

Minimized mass of tilting components with proportionally reduced difficulties in the practical realization thereof and reduced costs of materials.

Possibility to increase the conveying capacity by installing a number of devices D at different points and by which molds conveyed by bands running at higher speeds are acted upon, or even by having a single device D operated at a higher speed, due account being also taken of the fact that the considered device is normally operated at speeds similar to that of production lines.

The product is taken-up and laid down without dragging motions, but only across paths perpendicular, or nearly perpendicular to contacting planes.

Further important features and advantages are shown by the modified embodiment form of machine according to the invention, as shown in FIGS. 5 to 8b inclusive.

Referring now to said figures, the whole sucker positioning device is indicated generally by the reference letter P, being same device pivotally connected (see preceding FIGS. 1 to 4 inclusive) with the end of arm 9, swinging about the axis 11, instead of (left) sucker carrying member 1b, whilst no change is made in the components of right half, owing to the fact that while the components of right half are designed to withdraw the product from the molds, which mutual arrangement is known for a given production line, the components of left half shall take-out said product while being — as obviously — in position similar to those of right half components, with which they are confronted, being however the product to be differently positioned in each case into the packing boxes, according to requirements.

Figure 1:
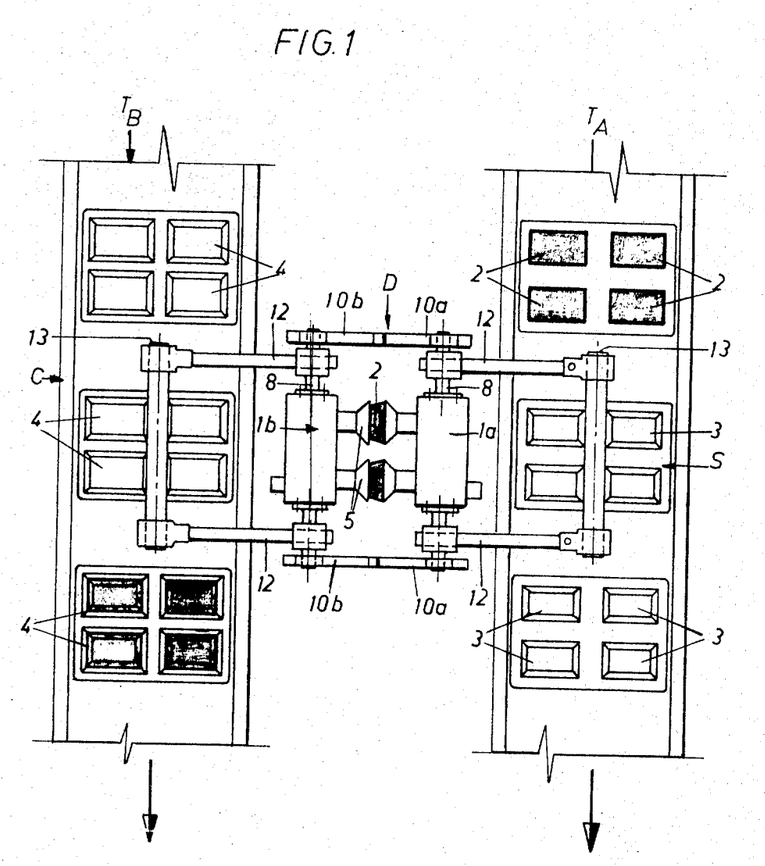
FIG. 1 is a plan view of the machine according to the invention, with the transfer mechanism in the position corresponding to the intermediate step of FIG. 3.
Figure 2:
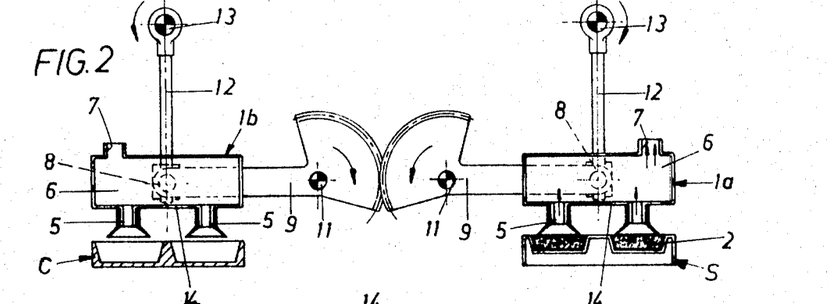
FIG. 2 is a side view of the transfer mechanism in the position corresponding to beginning of removal of products from the mold.
Figure 3:
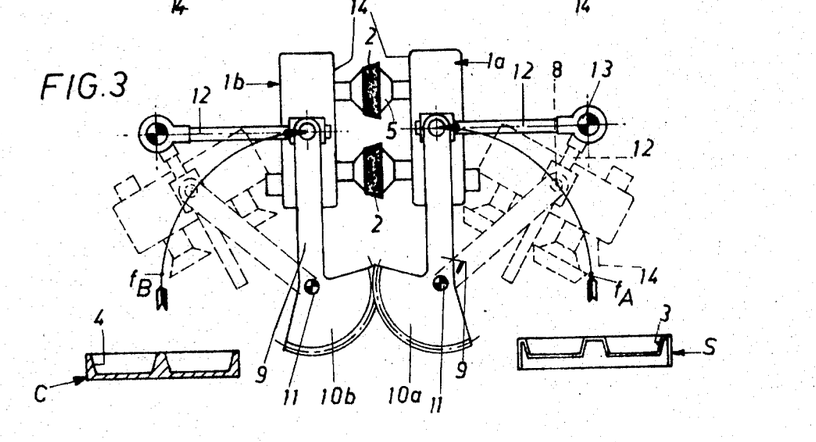
FIG. 3 is a side view similar to FIG. 2, however with the transfer mechanism in the position corresponding to the intermediate step, i.e., with the vertically confronted take-up members, the same being a position of said members, between between the position of FIG. 2 and of the position of said members shown in dash lines in FIG. 3.
Figure 4:
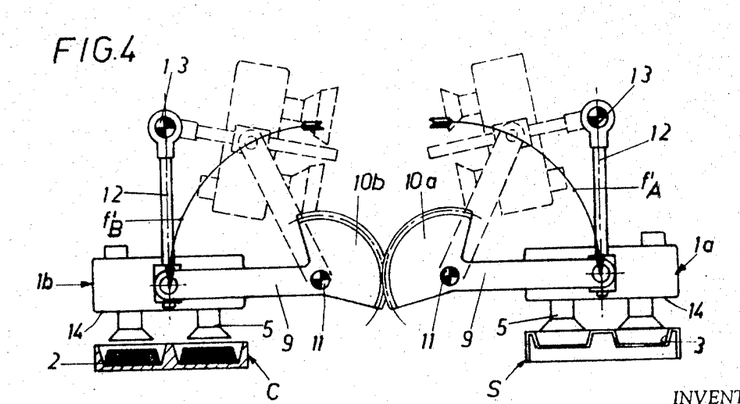
FIG. 4 is a side view, similar to the preceding ones, however with the members in the position corresponding to the final step, wherein the product is being laid down into a packing box.
Figure 5:
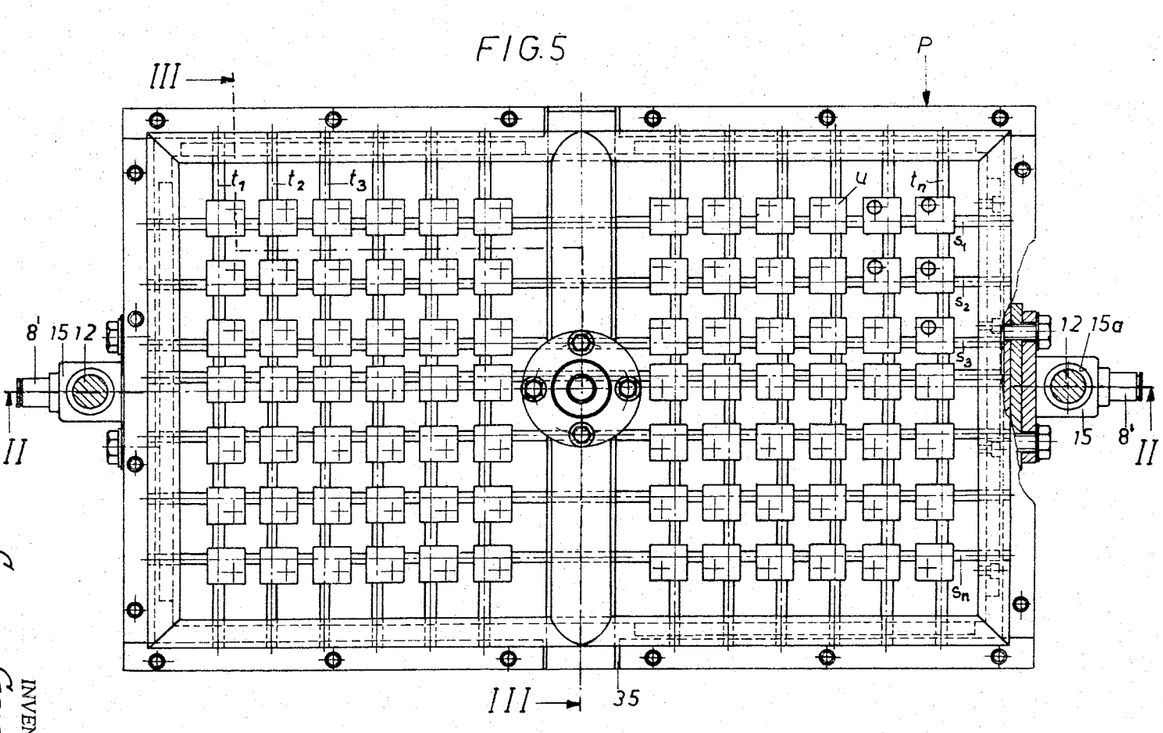
FIG. 5 is a plan view of positioning device according to another embodiment of the invention.
Figure 6:
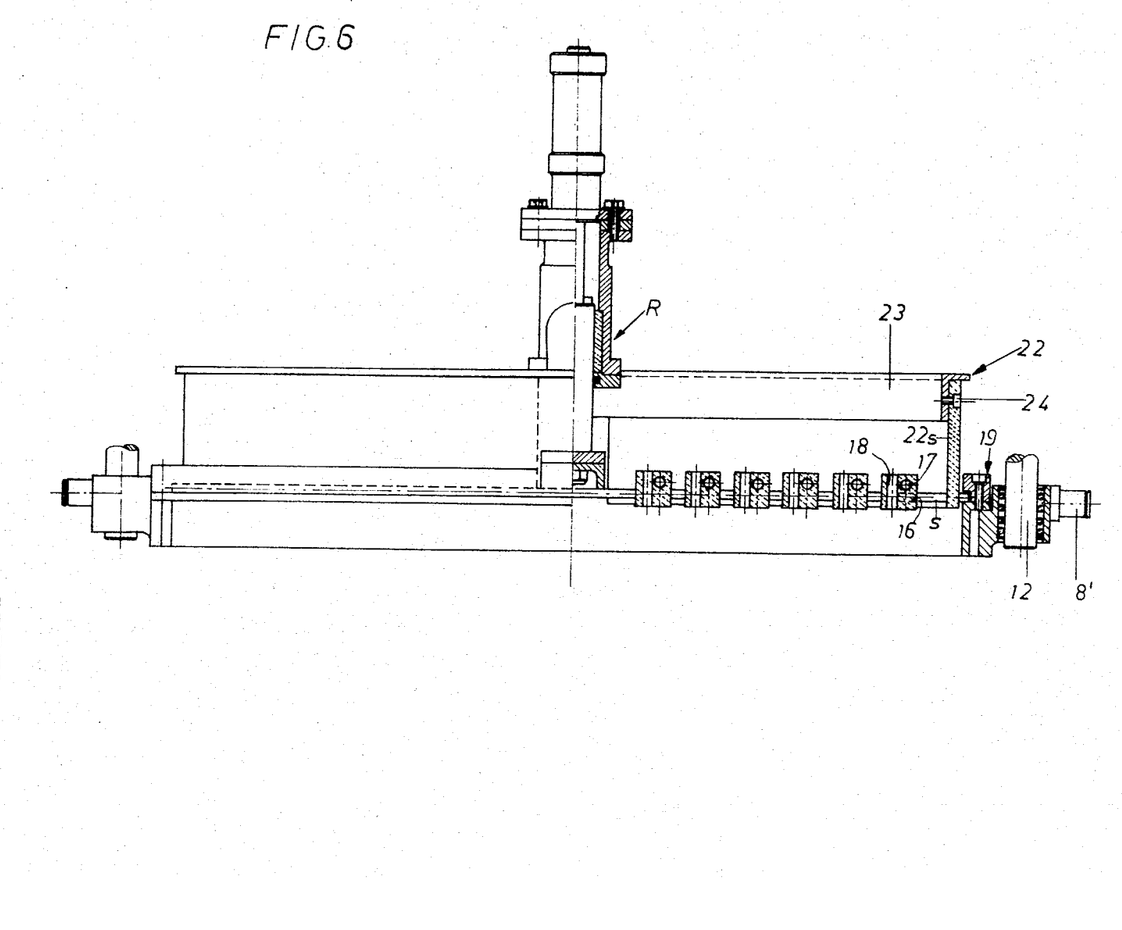
FIG. 6 is a partly vertical longitudinal section, taken along the line II — II of FIG. 5, the left side being a side view.

Stated what precedes, in FIGS. 5 and 6, 8' is the axis which in the FIGS. 1 to 4 inclusive is indicated by the reference numeral 8. Both ends of said axis 8' slightly protrude out of sucker carrying body P. Formed behind said ends are prismatic bosses 15 having bores 15a, through which the arms 12, pendularly hanging from the stationary axis 13 are threaded.

After having thus stated how the connection with the transferring device according to previously described embodiment form is established, a detailed description of proper positioning device is now given.

In the modified embodiment of the device under consideration, each sucker 5 is supported at the crossing point of a net-like structure, consisting of two rows of cylindrical rods, indicated by the reference symbols $s_1, s_2, s_3 \ldots s_n$, and $t_1, t_2, t_3 \ldots t_n$, respectively (for simplicity's sake, a few suckers only are shown in the figures).

All rods of each row are parallel with one another, and the rods of one row are perpendicular, at least in projection, to those of other row. In particular, the two planes wherein the two rod rows extend, are parallel with, and very near to each other, thus allowing said rods to cross themselves.

According to a fundamental aspect of this embodiment of the invention, a cubic block u, formed with two through bores extending perpendicularly with each other, is inserted on the rods at each crossing point thereof, being thus able to be moved in both perpendicular direction. The inner diameters of said bores and the outer diameters of rods are such as to allow a sliding fit therebetween. The two bores 16 and 17 reproduce therefore the arrangement of rods at each crossing point thereof, and extend themselves across different and well defined portions of cubic block. In particular (as shown more clearly in the perspective views of FIGS. 8a and 8b) the rods of row s, extending through the bores 16, are located in the upper left portion of each block, equal to one-fourth of surface area of the two crossed sides, while the rods of row *t* extend across the lower right zone of related sides (perpendicular to previously stated sides).

By such arrangement of bores in the cubic block, an easy sliding of the two rods therethrough is ensured, and in addition sufficient space is left for a third hole 18, perpendicular to said bores, and wherein the tubular shank 5a of suckers 5 is inserted. Indeed, said hole 18 can be drilled in the quarter of cubic block which is not crossed by the two bores.

The assembly formed by the two rod rows *s* and *t* (see FIGS. 5–8b) (approximately perpendicular with each other) is supported by a rectangular frame 19, consisting of four sides, having all the same cross-section. In particular, each side comprises a lower component 20 (see FIGS. 7a and 7b), acting as load bearing member and consisting of an angle iron, and of a preferably plastics channel 21, defining a groove 21a, wherein the rod ends are slidingly fitted. Said channels 21 are connected by screws to angle irons 20, whereby to be easily replaced when worn-out as a consequence of motion of rod ends in the groove 21a.

The rods are moved along their grooves by the motion of translation (in a direction normal to that of rod shifting) of a further frame 22, that can be moved relative to stationary frame 19 and thus also relative to rod assembly.

In particular, the movable frame 22 consists of oppositely located pairs of "combs" 22s for the rods *s* and 22t being for the rods *t*, being such combs 22s and 22t fitted near the related sides of stationary frame 19 and rigidly secured by screws 24 to a frame made of angle irons 23. Small portions of combs 22s and 22t are shown in the FIGS. 8a and 8b. They consist of elements having a rectangular cross-section which is elongated in the direction of their translation motion (as stated in more detail later on) and formed with slots 25s and 25t, wherein the rods $s_r$ and $s_t$ are engaged and guided. As shown in said figures, each slot shows a particular course (i.e., approximately vertical and more or less inclined to the right or to the left in respect of relative motion of two frames). Thus, as it can be readily appreciated, by forcing the combs, e.g., downwardly, in the direction of arrow *f*, the rods are shifted from the widely spaced position, as shown in the FIG. 8a, to the tightly spaced position of FIG. 8b. Such motion is obviously performed by all rods, and thus also by the suckers 5 carried by the cubic blocks *n*.

Figure 7A:
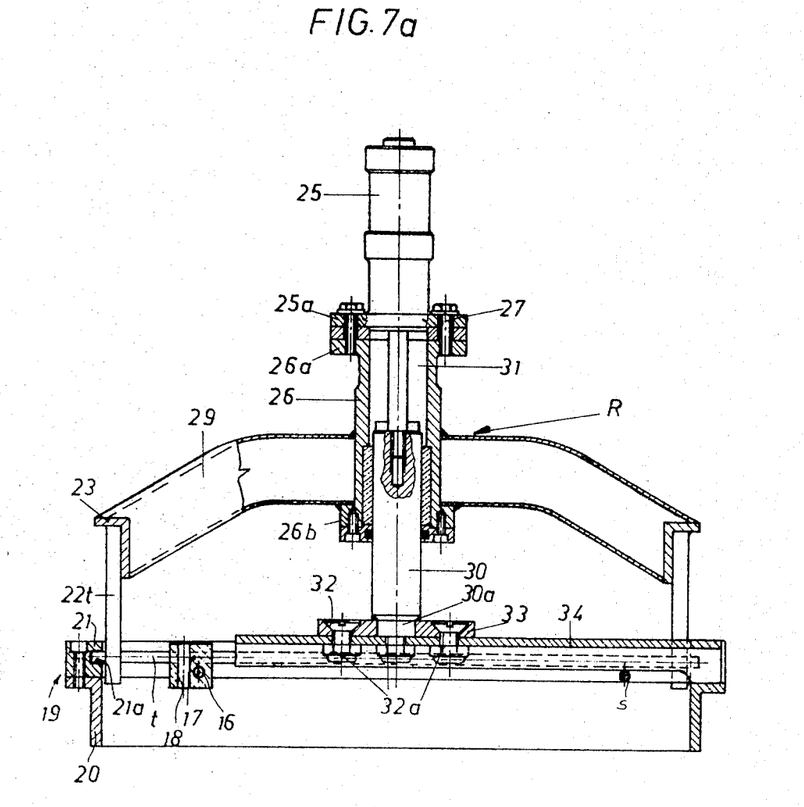
FIG. 7a is a further vertical section, taken at a right angle in respect of FIG. 6 one, on the line III—III of FIG. 5.
Figure 7B:
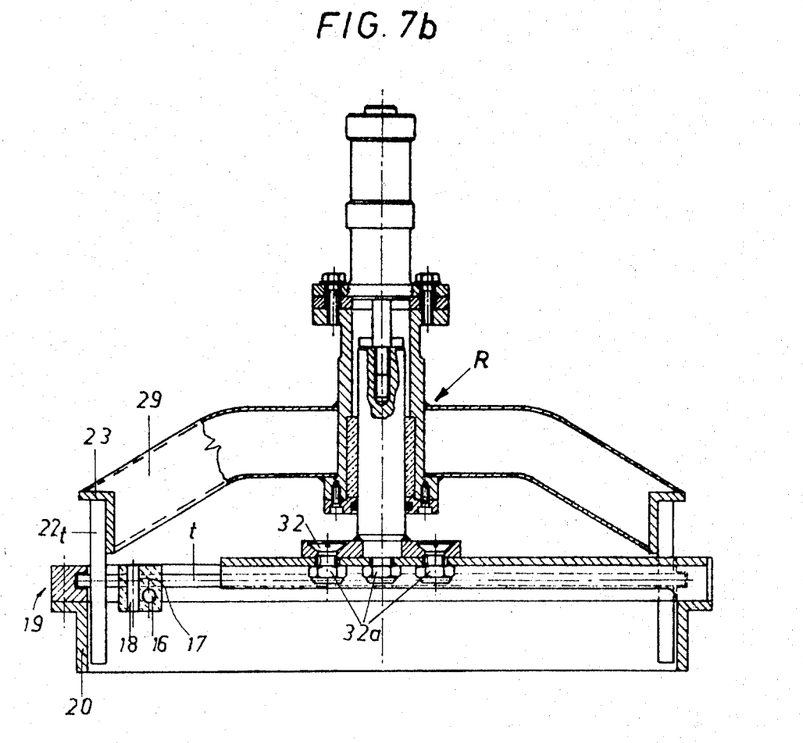
FIG. 7b is a section similar to that of FIG. 7a, but showing a different positioning of rods and of sucker carying blocks.
Figure 8A:
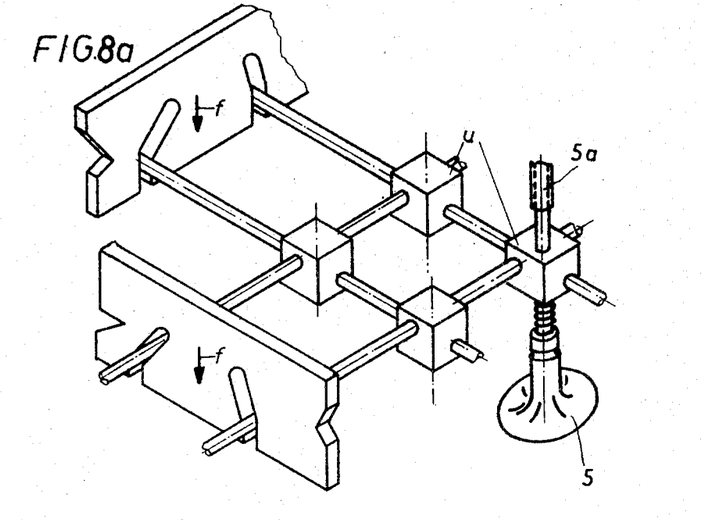
FIG. 8a is a perspective view of a detail, showing how the rods are connected with the combs.
Figure 8B:
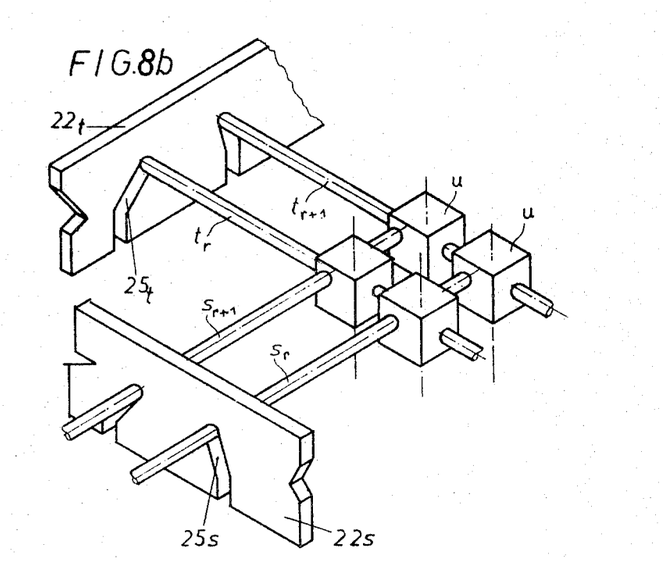
FIG. 8b shows the same detail of FIG. 8a, but with differently positioned rods and sucker carrying blocks.

To impart a motion to frame 22 relative to frame 19, recourse is conveniently made to means as shown in FIGS. 6 and 7a–7b. It is matter of a pneumatically operated device, indicated generally by the reference letter R, and that consists of stationary components and of movable components.

In particular, such device comprises a pneumatic cylinder, the outer body of which consists of an upper section 25, and of a bottom section 26, formed with flanges 25a and 26a, respectively, by which said sections are firmly connected together with the aid of screws 27.

Welded to the shoulder formed on the section 26 by its lower flange 26b (which is air-tight sealed by the cover 28) is a tubular yoke 29, which is in turn connected, also by welding, with the comb carrying frame. In particular, said yoke 29 extends parallel to minor sides of frame 23, and is connected therewith near the combs 22t.

The outer end 30a of rod 30 of piston which is slidingly fitted in the chamber 31, is rigidly connected by a plate 33 welded thereto and by the screws 32, with a bar 34, that extends parallel to positioning rods. Said bar 34 is C-shaped and is located with its open side directed downwardly, as shown in FIG. 7a, whereby to accommodate the nuts 32a of screws 32 and of end 30a, within the C-section, without hindering the motion of rods *t*. However, the positioning device, as shown in the FIG. 5, is designed for simultaneously filling two boxes and therefore the motion of rods t is stopped in the point wherein the channel 34 is connected with the components 21 of frame 19. Such connection is established with the aid of suitable seats 35 (see FIG. 5) with which the components 21 are expressly formed.

In point of fact, on the basis of above description, it can be inferred that, since the frame 19 is directly associated with the axis 8, and the whole assembly being movable perpendicularly to arms 12, when the piston rod 30 is moved from the position as shown in the FIG. 7a, to position shown in the FIG. 7b, the frame 23, by which the combs 22s and 22t are carried, is moved relative to frame 19, which is connected with the stationary structure of the machine.

In fact, rigidly connected with said frame 23 is the yoke 29, which is in turn connected with the body 26 of cylinder whereby, when compressed air is fed to the device (through the upper section 25) an outwardly directed thrust is exerted on rod 30, which however is kept fast with the structure of the machine, since it is rigidly connected with the frame 19, whilst the cylinder 26, along with the yoke 29 and the frame 23, is urged in the opposite direction.

The positioning motion is programmed in such a manner as to occur while the suckers are passed from the position wherein the product is withdrawn from the mating suckers, to the position as required for laying same product down into the boxes. Therefore, once the type of packing box is known, the expressly designed comb set 22s–22t is fitted on the machine, by which the chocolates are then properly conveyed and positioned.

I claim:

1. A machine for transferring molded choclate products from their shaping molds to packing boxes, said machine being of a type designed to operate between a first conveyor band wherein molds, coming from a molding plant, are continuously fed, and a second conveyor band, said machine being located at the level of said bands, said second band feeding empty packing boxes, said machine comprising:
    a. two sets of pneumatically operated similar members for taking-up and laying-down choclate products, respectively,
    b. means imparting to said sets of members oppositely directed swinging movement through 90° in respect of a vertical plane midway between the conveyor bands, said means being arranged to swing said sets of members from horizontal downwardly facing positions above related conveyor bands to confronting vertical positions, and c. vacuum distribution means timed to render the taking-up set of members effective and the laying-down set of members ineffective to hold said chocolate products from the time said taking-up set of members is in horizontal downwardly facing position until said taking-up set of members is in confronting position and to render said laying-down set of members effective and said taking-up set of members ineffective from the time said laying-down set of members is in confronting position until said laying-down set of members is in horizontal downwardly facing position so that said chocolate products are lifted from the mold by said taking-up set of members, confronted by the set of laying-down members, transferred to said set of laying-down members and finally laid down, overturned by 180°, into packing boxes conveyed by the second band, or directly onto the second band to be converted to wrapping equipment.

2. A machine according to claim 1, wherein means is included to synchronize the movement imparting means for both sets of members with the conveyor bands in a manner such that the time taken by the transfer operation is equal to the time required to bring the next mold below the set of taking-up members and the next empty box, when boxes are utilized, below the set of laying-down members.

3. A machine according to claim 1, wherein the movement imparting means includes two toothed sectors in mesh with one another, horizontal shafts located between and parallel to the conveyor bands, one sector being keyed to one shaft and the other sector being keyed to the other shaft, arms, a different arm being fastened to each sector, means pivotally connecting the free end of each arm with a different set of members for rotation about an axis extending through the center of gravity of such set, rods, each rod pendularly hanging from an overhead support and slidingly engaging a different set of members, said movement imparting means by reciprocating rotation of said sectors, said arms and said centers of gravity of said sets through 90° in opposite directions moving said sets along circular paths, while each set is simultaneously turned about said axis through 90°.

4. A machine according to claim 2, wherein reciprocating rotary motion is imparted to one of the shafts having keyed thereto a toothed sector in mesh with an opposite toothed sector.

5. A machine according to claim 1, wherein each set includes suckers consisting of tubular, funnel-like projections extending from a common chamber, and wherein means further is included alternately connecting said chambers with a vacuum source.

6. A machine according to claim 5, wherein each set includes an interchangeable plate from which the suckers extend, whereby to permit adjustment of the number and arrangement of suckers.

7. A machine according to claim 1, wherein the sets of members include penumatically controlled suckers and wherein means is provided to shift the relative relationship of the suckers in the set of laying-down members, in a plane, between an arrangement in confronting position matching the arrangement of the suckers in the taking-up set of members and another preselected arrangement whereby to rearrange the suckers of the laying-down set of members in their downwardly facing position in any preselected pattern.

8. A machine according to claim 7, wherein the sucker shifting means includes two rows of round rods, lying in planes perpendicular and very near to one another, with said rods near one another at their crossing points, a sucker carrying cubic block fitted to the rods at each crossing point, each said block having two through bores oriented in the same direction as the two rods that extend therethrough, whereby to allow each block to be moved along either rod in order to enable the crossing points of a net-like structure formed by the blocks and also the suckers to be shifted nearer to or further away from one another, a rod-supporting frame, two combs on each frame, said combs being formed with oriented inclined slots in which the ends of the rods are guided, said slots being so inclined that upon movement of the combs relative to the rods in a direction perpendicular to the planes of said rods, different positioning of the cubic blocks will be obtained.

9. A machine according to claim 8, wherein a cylinder-piston unit is included to move the combs relative to the rods, the rods being connected to the piston rod and the combs being connected to the cylinder and to the stationary frame of the machine.

10. A machine according to claim 9, wherein a yoke is provided which is fast to the cylinder, the yoke being rigidly connected to the centers of opposite sides of a movable comb-carrying frame, a bar associated with the rod, said bar extending in the same direction as the yoke, and a stationary comb-carrying frame, relative movement of said frames caused by relative movement of the cylinder and bar shifting the rods and concomitantly the relative positions of the cubic blocks in a plane.

* * * * *